Patented Feb. 7, 1950

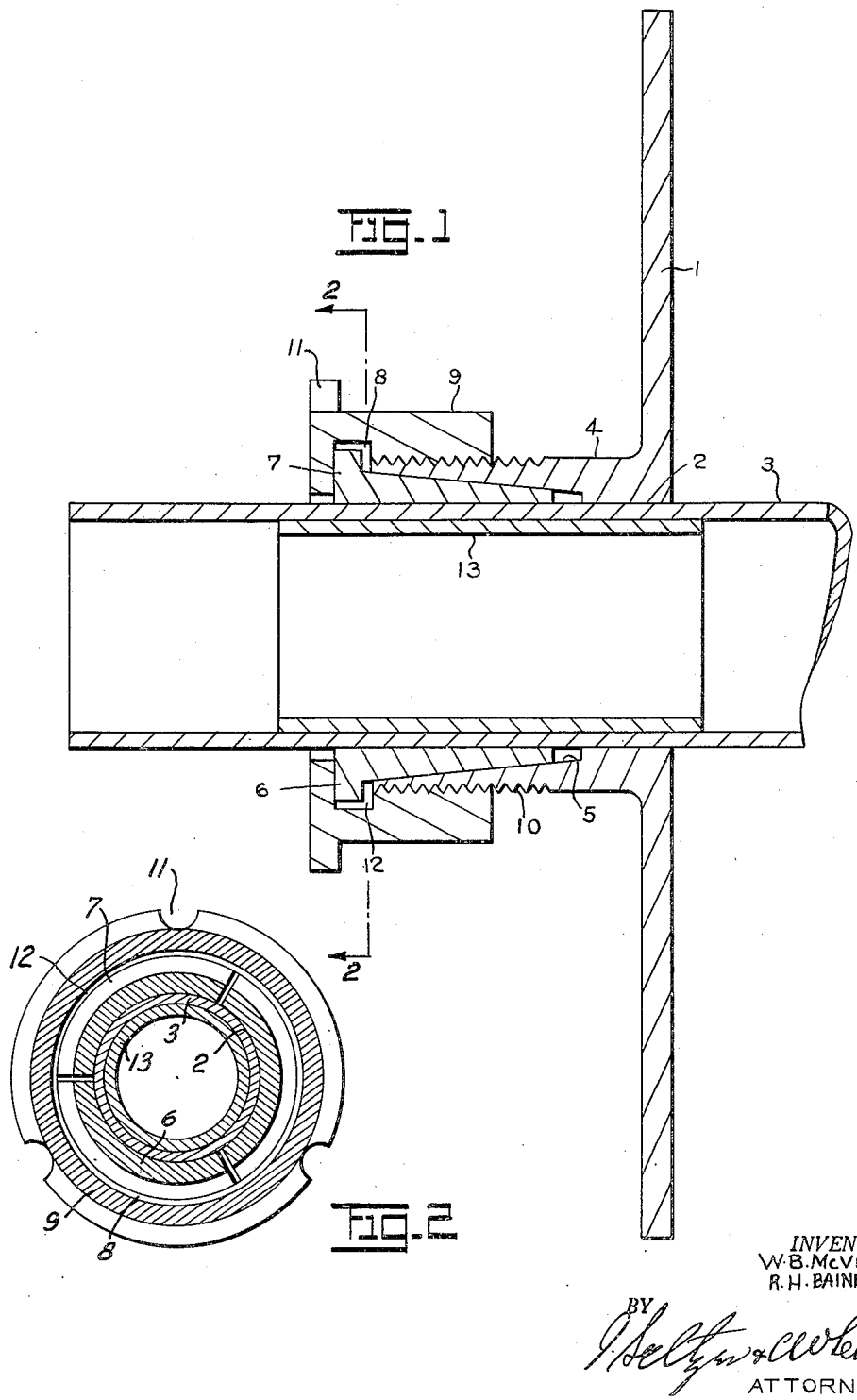

2,496,402

UNITED STATES PATENT OFFICE 2,496,402

FRICTION GRIP

William Beggs McVeigh and Richard Henry Baines, Spondon, near Derby, England, assignors to Celanese Corporation of America, a corporation of Delaware Application March 12, 1946, Serial No. 653,780
In Great Britain March 15, 1945

1 Claim. (Cl. 242—124)

This invention relates to a novel form of friction grip for use on cylindrical objects.

A well-known form of friction grip for a cylindrical object comprises a split cone the elements of which are driven end-wise by a back nut so as to be forced inwardly on to the object by engagement with a correspondingly coned surface. The very effectiveness of such a grip is liable to be a drawback because the various parts of the grip itself as well as the surface of the cylindrical object it grips are liable to suffer damage in attempts to free the cone by force when it is desired to remove the grip.

The present invention comprises a friction grip of the type described in which the drawback referred to is overcome by using the same means to free the cone as is used to tighten it. In a convenient form of construction the cone is provided with a collar adapted to lie within a counterbored groove in the back nut whereby movement of the back nut axially in either direction causes similar movement of the cone.

In the accompanying drawing wherein a preferred embodiment of this invention is shown, Fig. 1 is a cross-sectional view showing the adjustable flange secured to the end of a warp beam, and Fig. 2 is a cross-sectional view taken along line 2—2 of Fig. 1, on a smaller scale.

Like reference numerals indicate like parts throughout both views of the drawing.

Referring to the drawing, the adjustable flange comprises a flange body 1 bored at 2 to be a push fit on a beam 3 and provided with a boss 4 internally tapered at 5 to receive the several parts, say three, of a tapered split cone 6. The cone is turned with a collar 7 lying within a counterbored groove 8 in a back nut 9 screwed to fit on to a threaded portion 10 of the boss 4. The back nut 9 is provided with slots 11 or other devices to fit a suitable key with the aid of which the nut 9 can be screwed on or off the boss 4. When screwed on the nut 9 presses the parts of the split cone 6 into the internal taper 5 of the bush 4 and compresses them on to the beam 3. When screwed off a shoulder 12 at the inner end of the groove 8 in the back nut 9 presses behind the collar 7 on the cone 6 and withdraws the latter from the taper 5, thus freeing the flange gently from engagement with the beam. It should be noted that in order that the collar 7 on the cone 6 may enter the groove 8 in the back nut 9 the cone 6 must be split by wide slots when it is cut into several parts.

Where the beam 3 is of lightweight construction a sleeve 13 may be fitted to reinforce the beam in the neighbourhood of the flange. At the open end of the beam a spider (not shown) may be fixed to carry a spindle on which the usual removable brake ruffle can be secured.

Such an adjustable flange offers considerable advantages over existing devices. Thus the new device can be of robust construction and it may be used repeatedly without being damaged and without damaging the beam on which it is used. Moreover the invention avoids the necessity of providing threaded ends or threaded sleeves on the beams; devices employing such threaded ends or threaded sleeves suffer from the drawback that the risk of damage to the screw threads is very great. Finally, the device can be used on wooden as well as on lightweight (aluminium alloy) metal beams. In the former case the device can be operated directly on the wood or the ends of the beam may be provided with metal sleeves.

Having described our invention, what we desire to secure by Letters Patent is:

An adjustable flange for warp beams, which comprises a flange body bored to be a push fit on the beam and provided with a boss externally threaded and internally tapered, a split cone correspondingly tapered, a back nut internally threaded to engage with the thread of said boss and adapted to drive the elements of said cone endwise so as to force them inwardly on to the beam by engagement of cone elements with the internally tapered surface of said boss, said back nut having a counter-bored groove and said cone being provided with a collar adapted to lie within said groove, whereby said back nut is also adapted to free the elements of said cone from engagement with the beam.

WILLIAM BEGGS McVEIGH.
RICHARD HENRY BAINES.

REFERENCES CITED

The following references are of record in the file of this patent:

UNITED STATES PATENTS

| Number | Name | Date |
|---|---|---|
| 258,797 | Newell | May 30, 1882 |
| 1,561,507 | Clark | Nov. 17, 1925 |
| 1,981,142 | Fulton et al. | Nov. 20, 1934 |
| 2,381,697 | Shepard | Aug. 7, 1945 |

FOREIGN PATENTS

| Number | Country | Date |
|---|---|---|
| 397,613 | Great Britain | Aug. 31, 1933 |
| 804,149 | France | July 27, 1936 |